UNITED STATES PATENT OFFICE.

HERBERT LEVINSTEIN AND JAMES BADDILEY, OF BLACKLEY, MANCHESTER, ENGLAND, ASSIGNORS TO LEVINSTEIN LIMITED, OF MANCHESTER, ENGLAND.

PRODUCTION OF FAST SHADES ON VEGETABLE FIBERS AND DYESTUFFS THEREFOR.

1,232,056.  Specification of Letters Patent.  Patented July 3, 1917.

No Drawing.   Application filed December 1, 1913.   Serial No. 804,117.

*To all whom it may concern:*

Be it known that we, HERBERT LEVINSTEIN and JAMES BADDILEY, both subjects of the King of Great Britain and Ireland, and both residents of Blackley, Manchester, in the county of Lancaster, England, have invented new and useful Improvements in the Production of Fast Shades on Vegetable Fibers and Dyestuffs Therefor, of which the following is a specification.

It has been shown in the specification of our prior British Letters Patent No. 27525 of 1912 that by coupling two molecules of resorcin with a tetrazo body of the following general formula

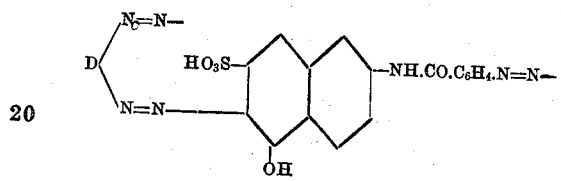

where D is a residue of the general constitution.

Ar.CO.NH.Ar where Ar represents an aryl radical, bright substantive orange, red, or brown dyestuffs are obtained, which, after dyeing, are fixed with formaldehyde on vegetable fiber. Shades faster to boiling soap than those produced by developed dyestuffs are thus obtained more conveniently than by methods involving the use of either developed or vat dyestuffs.

We have found on further investigation that similarly fast other shades may be obtained on vegetable fibers by other dyestuffs of analogous composition by similarly aftertreating the dyed shades with formaldehyde. The new dyestuffs are obtained by coupling two molecules of resorcin with tetrazo compounds of the formula:—

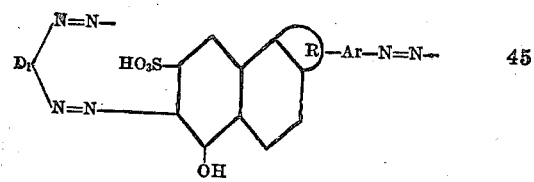

R indicating a ring formation and including 1.2-aminoaryl: triazol-, oxazol-, thiazol-, imidazol-, azimido-, residues of the compounds indicated in the formula, $D_1$ being a residue of the following constitution

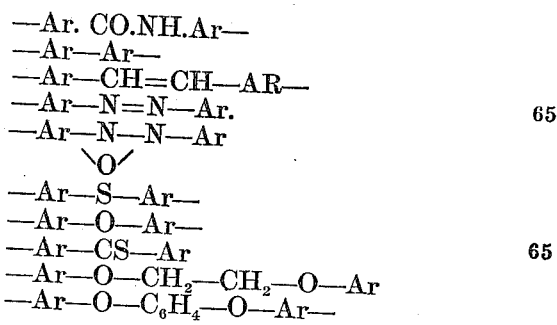

Ar indicating an aromatic radical.

Example: 256 parts of meta-meta-diamino-azoxytoluene are converted into the tetrazo compound by means of 138 parts of sodium nitrite, and the necessary amount of hydrochloric acid, and the tetrazo compound combined in soda-alkaline solution with 356 parts of metataminophenyl-1:2-naphthimidazol: 5 oxy: 7 sulfonic acid. The intermediate compound thus obtained is rediazotized by means of 68 parts of sodium nitrite and the necessary quantity of hydrochloric acid and the resulting tetrazo compound combined with 220 parts of resorcin in the presence of an excess of sodium carbonate. When the combination is completed the dyestuff is isolated in the usual manner. It dyes cotton directly and when the dyeings are aftertreated with 3% formaldehyde (40%) at a temperature of 70°–80° C. for 20–30 minutes yellowish-red shades extremely fast to boiling soap are obtained.

If instead of diaminoazoxytoluene in the above example metataminobenzoylmetaphenylenediamin is used, similarly fast shades are obtained, but of a yellower tone.

What we claim is:—

1. The process of producing dyestuffs capable of being fixed on vegetable fibers by aftertreatment with formaldehyde, which process consists in coupling two molecules of resorcin with tetrazo compounds having a nucleus of the general constitution:—

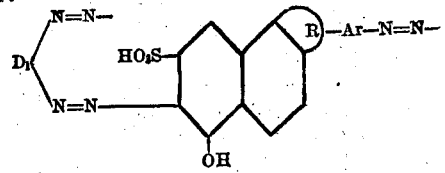

in which R stands for a ring formation containing nitrogen in the ring and $D_1$ represents the nucleus of a diamin containing at least two aryl nuclei one of which is joined to each azo group attached to said nucleus.

2. Dyestuffs capable of being fixed on vegetable fibers by aftertreatment with formaldehyde, formed by coupling two molecules of resorcin with tetrazo compounds having a nucleus of the general constitution:

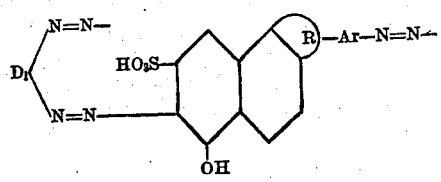

in which R stands for a ring formation containing nitrogen in the ring and $D_1$ represents the nucleus of a diamin containing at least two aryl nuclei one of which is joined to each azo group attached to said nucleus.

In witness whereof we have hereunto set our hands in the presence of two subscribing witnesses.

HERBERT LEVINSTEIN.
JAMES BADDILEY.

Witnesses:
ERNOLD SIMPSON MOSELEY,
MALCOLM SMETHURST.